(12) United States Patent
Vialatte et al.

(10) Patent No.: US 10,571,318 B2
(45) Date of Patent: Feb. 25, 2020

(54) MEASURING AIR FLOWS ALONG A WALL

(71) Applicants: Airbus (S.A.S.), Blagnac (FR); Airbus Operations (S.A.S.), Toulouse (FR)

(72) Inventors: Jean-Luc Vialatte, Toulouse (FR); Philippe Tatry, Balma (FR); Gilles Studer, Fonsorbes (FR); Laurent Malard, Toulouse (FR); Nicolas Benoit, Toulouse (FR)

(73) Assignees: AIRBUS (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 515 days.

(21) Appl. No.: 15/265,466

(22) Filed: Sep. 14, 2016

(65) Prior Publication Data

US 2017/0074750 A1    Mar. 16, 2017

(30) Foreign Application Priority Data

Sep. 15, 2015 (FR) ...................................... 15 58599

(51) Int. Cl.
*G01F 1/66* (2006.01)

(52) U.S. Cl.
CPC .................... *G01F 1/661* (2013.01)

(58) Field of Classification Search
CPC .................................................. G01P 13/025
See application file for complete search history.

(56) References Cited

U.S. PATENT DOCUMENTS

| 6,342,846 B1* | 1/2002 | Argentieri ............ G01P 13/025 340/967 |
| 2015/0008260 A1* | 1/2015 | Volfson ................. G01S 17/107 235/404 |

OTHER PUBLICATIONS

D. Fisher et al.: "In-Flight Flow Visualization Characteristics of the NASA F-18 High Alpha Research Vehicle at High Angles of Attack," NASA Technical Memorandum 4193, May 1990.
G. Azzellino et al.: "Fully Inkjet-Printed Organic Photodetectors with High Quantum Yield," Advanced Materials, vol. 25, No. 47, Dec. 1, 2013 (Dec. 1, 2013), pp. 6829-6833, XP055285308, DE, ISSN: 0935-9648, DOI: 10.1002/adma.201303473.
French Search Report for Application No. 1558599 dated Jul. 1, 2016.

* cited by examiner

*Primary Examiner* — Luke D Ratcliffe
(74) *Attorney, Agent, or Firm* — Jenkins, Wilson, Taylor & Hunt, P.A.

(57) ABSTRACT

A simple device for accurately measuring real-time air flows along a wall, and relating to a measuring device including an optical sensor configured to measure an illuminance distribution on a free surface of the optical sensor. A mobile member movably is mounted on the light sensor by partially covering its free surface, the mobile member being adapted to be freely directed by a local air flow pattern, thus, modulating the illuminance distribution on the free surface so as a current illuminance distribution measurement by the optical sensor indicates the current direction of the mobile member representing the current air flow pattern.

13 Claims, 8 Drawing Sheets

MEASURING AIR FLOWS ALONG A WALL

CROSS-REFERENCE TO RELATED APPLICATION

This application claims priority to French Patent Application FR 15 58599 filed Sep. 15, 2015, the entire disclosure of which is incorporated by reference herein.

TECHNICAL FIELD

The present disclosure relates generally to the field of measurements of a flow of air, and more particularly to aerodynamic measurement and visualization in real time of flows of air along a wall to characterize the parietal flow of an object of vehicle or aircraft type moving in air.

BACKGROUND

The technique traditionally used in the field of aeronautics to measure the aerodynamic flow along a wall consists in the observation of wool or nylon filaments called "tufts" stuck to the wall at one of their ends. However, these "tufts" can have an inherent instability with no direct link to the characteristics of the flow. Accordingly, in order to remedy these drawbacks, the "tufts" have been progressively replaced by plastic material "flow cones". A flow cone is rigid, thin and light in weight and can be attached to the wall by a nylon filament at the level of the apex of the cone. Its lightness allows it to move freely and to align itself with the direction of the flow of the air.

Accordingly, in order to measure the aerodynamic flow over an aircraft, flow cones are installed in areas of the aircraft where the analyses are required. Because of their lightness the flow cones exhibit characteristic movements according to the type of aeronautical flow and the shape of which enables visualization in a video recording. These flow cones are filmed by onboard video cameras the recordings from which enable use of the data in real time or off-line.

However, this technique does not make it possible to study masked areas where it is difficult or even impossible to install the instrumentation, such as on the underside of the aircraft, for example. Moreover, it does not make it possible to measure accurately the direction of the flow over the wall and therefore does not make it possible to obtain an objective criterion as to the state of the flow.

For a more global characterization of the aerodynamic flow over an aircraft, NASA has developed a technique of injection of a fluid containing a tracer and a solvent during a stable phase of the flight. The rubbing at the wall will entrain this fluid along lines the geometry of which depends on the conditions of flow. The evaporation of the solvent while the flight conditions are maintained constant (for one to two minutes) will allow the tracer to be fixed. Once on the ground all the necessary observations may be made. This technique is described by D. Fisher et al. in the document entitled "*In flight flow visualisation characteristics of the NASA F18 high Alpha research vehicle at high angle of attack*", NASA technical memo 4193, May 1990.

However, the technique of injection of and drying of a tracer in flight does not provide access to a real time visualization of the flow and moreover makes it possible to characterize only one test point per flight.

An object of the present disclosure is therefore to remedy the aforementioned drawbacks by an accurate air flow measuring device and a system for global measurement in real time of the aerodynamic flow over a wall at the same time as making it possible to carry out the measurement over all the areas of a wall and in a recurrent manner.

SUMMARY

The present disclosure provides an air flow measuring device including:
an optical sensor configured to measure an illuminance distribution over a free surface of the optical sensor; and
a member movably mounted on the optical sensor and partially covering its free surface, the member, called the mobile member, being adapted to be freely oriented with the local flow of air, thereby modulating the distribution of the illuminance over the free surface so that a current measurement by the optical sensor of the distribution of the illuminance indicates the current orientation of the mobile member representing the current flow of air.

This device makes it possible to carry out relatively non-intrusive measurements over all the areas of the wall in real time and in a recurrent manner. Accordingly, where the wall is part of an aircraft, the measurements may be carried out over all the areas of the aircraft. It is no longer necessary to have the analyzed aerodynamic area in view or to use a video camera to visualize the mobile member indicating the aerodynamic data. Moreover, this device utilizes the natural ambient illuminance and necessitates no additional light source device.

The optical sensor advantageously comprises an annular photodetector consisting of or comprising a predetermined number of light-detecting tracks and delivering signals representing the illuminance received by each of the tracks, thereby generating the measurement of the distribution of the illuminance over the free surface of the optical sensor.

The optical sensor advantageously consists of or comprises printed organic electronic components and the optical sensor has an angular measurement accuracy of the order of 1° to 5°.

The mobile member advantageously includes a plane part covering a part of the free surface of the optical sensor. For example, the plane part has the shape of an angular sector delimited by two radii forming between them an angle greater than 5°. The angle is advantageously equal to 180°.

The mobile member advantageously includes a fin disposed perpendicularly on the plane part.

The optical sensor is advantageously configured to detect an illuminance by ambient light. In particular, the optical sensor has a luminous detection sensitivity in a range of approximately 100 lux to 100000 lux.

The disclosure herein is also directed to a measuring module comprising one or more measuring devices having any one of the above features.

The measuring module advantageously includes a substrate on which the measuring device or devices is or are disposed.

The disclosure herein is also aimed at a system for aerodynamically measuring in real time flows of air along a wall, including at least one measuring module, each measuring module being adapted to be installed in a predetermined position on an area of interest of the wall so that the measurements generated by the optical sensor or sensors of the measuring module represent the aerodynamics of the wall.

The system advantageously includes acquisition and processing units configured to acquire the current measurement from each optical sensor and to convert it into a current digital measurement defining the current orientation of the mobile member mounted on the corresponding optical sensor.

The system advantageously includes an emission device configured to emit in real time data relating to the orientations of at least one mobile member mounted on at least one optical sensor of the measuring module.

The system advantageously includes a visualization interface configured to visualize in real time the orientations of at least one mobile member of the measuring module.

The system advantageously includes an analysis device configured to determine aerodynamic parameters of the wall comprising the status of the parietal flow and the direction of the parietal stream lines as a function of the position of the measuring module and the orientations of at least one mobile member of the measuring module.

The system therefore makes it possible to determine the direction of the flow over the wall and not only the aerodynamic state.

The disclosure herein is also directed to an aircraft including a measuring system having any one of the above features.

BRIEF DESCRIPTION OF THE DRAWINGS

Other particular features and advantages of the system and the method in accordance with the disclosure herein will become more apparent on reading the description given hereinafter by way of nonlimiting illustration and with reference to the appended drawings, in which.

DETAILED DESCRIPTION

A principle of the disclosure herein comprises employing a system for measuring the flow of air based on a relatively non-intrusive optical sensor making it possible to measure and to visualize in real time the aerodynamics of a wall moving relative to air.

It should be noted that the disclosure herein concerns any object moving in air or subject to a flow of air and may be applied to an aircraft, a train, an automobile, a boat, a wind tunnel, etc.

Figure 1A:
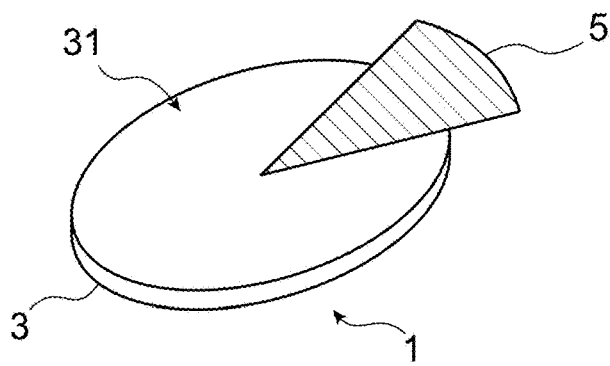
FIG. 1A illustrates diagrammatically a device for measuring a flow of air as used in one embodiment of the disclosure herein.

FIG. 1A illustrates diagrammatically a device in accordance with the disclosure herein for measuring a flow of air.

In accordance with the disclosure herein, the measuring device 1 includes an optical sensor 3 and a mobile member 5.

The optical sensor 3 has a free surface 31 adapted to be illuminated by ambient light whilst being photosensitive to the distribution of the illuminance. The optical sensor 3 is therefore configured to measure the distribution of the illuminance over its free surface 31. The optical sensor is more particularly configured to detect ambient light illuminance with a luminous detection sensitivity of approximately 100 lux to 100000 lux. This makes it possible to cover tests on an aircraft close to the ground with the sensor receiving indirect illuminance up to high-luminosity tests at altitude with direct illuminance.

Moreover, the part 5 is movably mounted on the optical sensor and partly covers the free surface 31 of the sensor. This part 5, called the mobile member, therefore masks a part of the free surface 31 of the optical sensor 3. Moreover, the mobile member 5 is a light element that is configured to follow the local aerodynamic by virtue of being freely oriented in accordance with the local flow of air or the type of aerodynamic flux that is applied to it. The distribution of the illuminance over the free surface of the optical sensor therefore depends on the angular position or the orientation of the mobile member. In other words, the movement of the mobile member 5 modifies or modulates the distribution of the illuminance over the free surface of the optical sensor and therefore a current measurement by the optical sensor of the distribution of the illuminance indicates the current orientation of the mobile member given that this current orientation represents the current flow of the air.

Figure 1B:
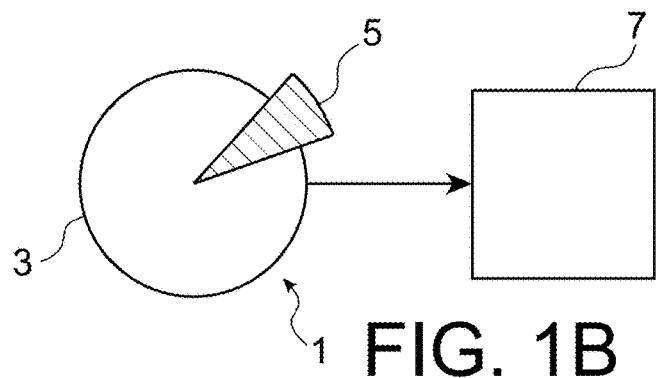
FIG. 1B illustrates diagrammatically a system for measuring a flow of air along a wall as used in one embodiment of the disclosure herein.

FIG. 1B illustrates diagrammatically a system in accordance with one embodiment of the disclosure herein for measuring a flow of air along a wall.

The measuring system includes at least one measuring device 1 as shown in FIG. 1A and acquisition and processing units 7. The measuring device 1 is adapted to be installed on a wall 9 and to generate current measurements of the distribution of the illuminance over the free surface of the optical sensor. The acquisition and processing units 7 are configured to acquire each current measurement made by the optical sensor in order to convert it into a current digital measurement indicating the current orientation of the mobile member that represents the flow of the air along the wall. The digital measurements include a limited quantity of data (i.e. primarily the orientation of each mobile member) and can therefore be easily transmitted in real time to an analysis center for analyzing the aerodynamics of the wall. Moreover, the limited quantity of digital data does not necessitate a large transmission bandwidth.

Figure 2:
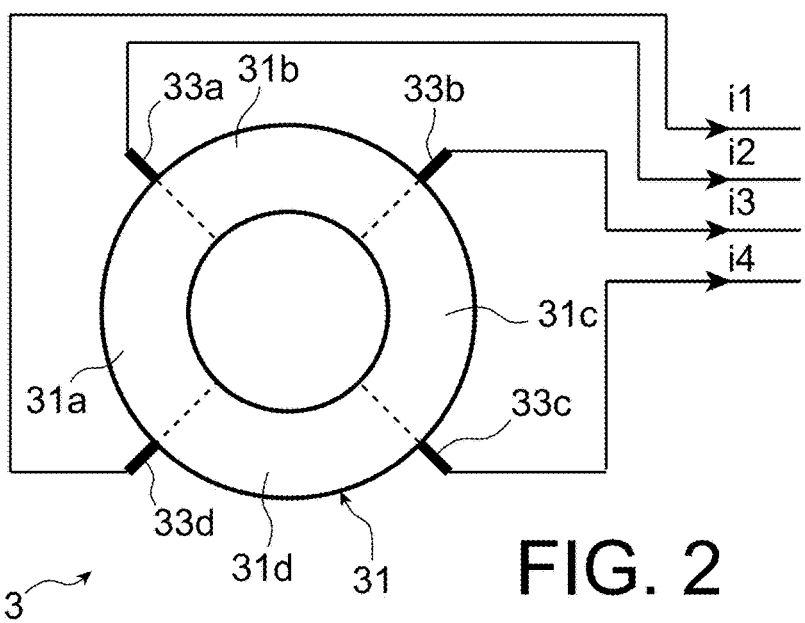
FIG. 2 illustrates diagrammatically a device for measuring a flow of air as used in one embodiment of the disclosure herein.

FIG. 2 illustrates diagrammatically an optical sensor in accordance with one embodiment of the disclosure herein.

The optical sensor 3 in accordance with this embodiment comprises an annular photodetector 31 consisting of or comprising a predetermined number of light-detecting tracks 31a-31d. These tracks deliver signals representing the illuminance received by each of the tracks, thus generating the measurement of the distribution of the illuminance over the free surface of the optical sensor.

In accordance with the FIG. 2 example, the photodetector 31 is more particularly made up of printed organic electronic components and includes four current extraction connections 33a-33d connected to the photosensitive ring 31 with a regular spacing so that each part between two consecutive extraction connections forms a light-detecting track. In effect, the organic electronics make it possible to carry out differential measurements and each extraction connection 33a-33d can therefore be associated with a corresponding track 31a-31d. The signals delivered by the tracks then correspond here to current intensities i1-i4 output by the extraction connections 33a-33d. Each current intensity i1-i4 represents the illuminance received by the corresponding track 31a-31d.

Moreover, the organic electronic components make it possible for the optical sensor 3 to be thin (for example less than 1 mm thick) and flexible.

Figure 3:
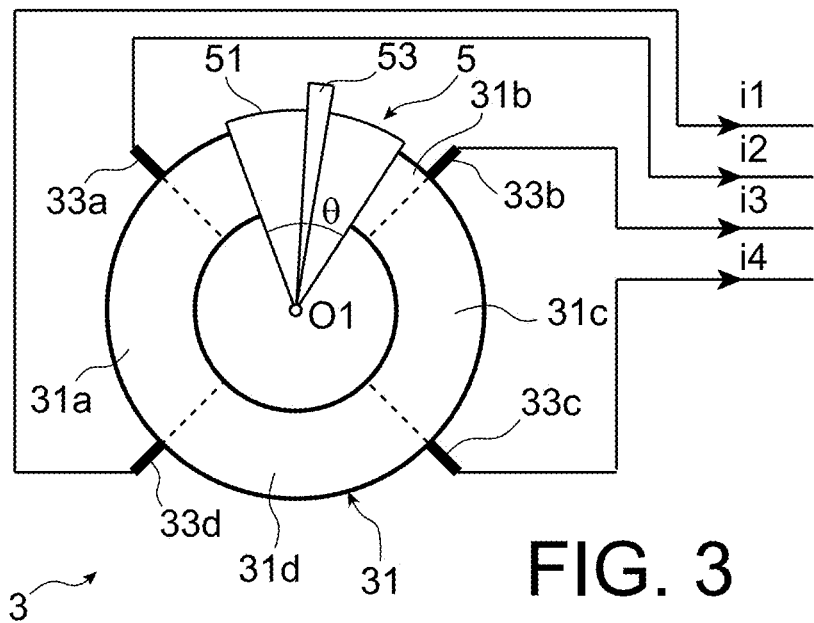
FIG. 3 illustrates diagrammatically a mobile member mounted on an optical sensor as used in one embodiment of the disclosure herein.

FIG. 3 illustrates diagrammatically a device in accordance with one embodiment of the disclosure herein for measuring a flow of air.

The measuring device includes a mobile member mounted on an optical sensor. The mobile member 5 includes a plane part 51 covering a part of the free surface of the optical sensor 3.

The plane part is advantageously the shape of an angular sector (i.e. a disk sector) delimited by two radii forming between them a predetermined measuring angle θ. The angle θ is greater than 5°, for example, and may for example be between 5° and 180°. It should be noted that the plane part 51 of the mobile member 5 makes it possible to minimize the leakage of light under the mobile member 5 in order to have an optimum contrast between the masked area and that exposed to the light.

The plane part 51 of the mobile member 5 is movably mounted about a rotation axis centered on the center O1 of the photosensitive ring 31. The part of the photosensitive ring 31 covered by the mobile member 5 is masked and therefore does not receive any light whereas the complementary part is exposed to the light. The angular position of the mobile member 5 therefore affects the distribution of the illuminance over the various tracks 31a-31d of the photosensitive ring 31 and the current intensity values i1-i4 delivered by the extraction connections 33a-33d are therefore also affected by the angular position of the mobile member 5. Knowing the current intensities i1-i4 delivered by the optical sensor 3 it is then easily possible to deduce the angular position of the mobile member 5.

The mobile member 5 advantageously includes a fin 53 disposed along the central radius of its angular sector and perpendicularly to the plane part 51 and therefore making it possible to facilitate the rotation of the mobile member 5 in accordance with the direction of the flow. The fin 53 may be of prism or parallelepiped shape with a cross section (i.e. a section in a plane perpendicular to the plane part 51 and to the central radius) of triangle, star, rectangular or any other suitable shape.

Figure 4:
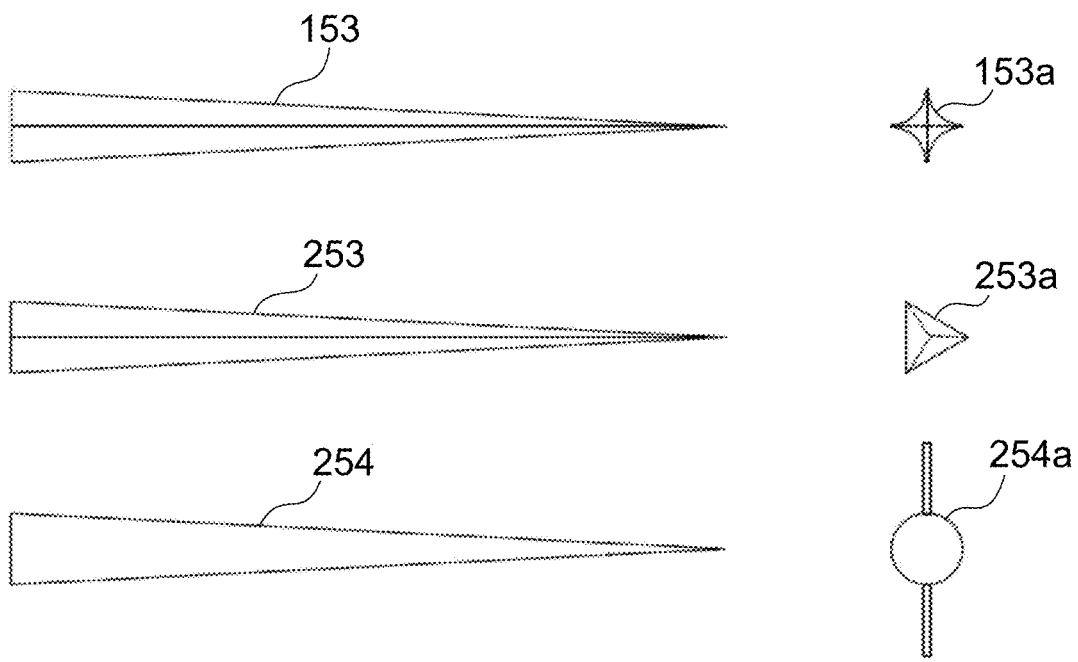
FIG. 4 illustrates diagrammatically various fin shapes as used in various embodiments of the disclosure herein.

FIG. 4 illustrates diagrammatically various fin shapes in accordance with various embodiments of the disclosure herein.

The fins 153, 253 and 254 represented in the FIG. 4 example have a divergent shape but with different sections 153a, 253a, 254a. In fact, the section 153a of the fin 153 has a star shape or more particularly a regular quadrilateral shape with curved and concave sides. The section 253a of the fin 253 is an equilateral triangle. The section 254a of the fin 254 has the shape of a circle with two straight and diametrically opposite protrusions.

FIGS. 5A-8B illustrate diagrammatically various shapes of mobile members in accordance with various embodiments of the disclosure herein.

Figure 5A:
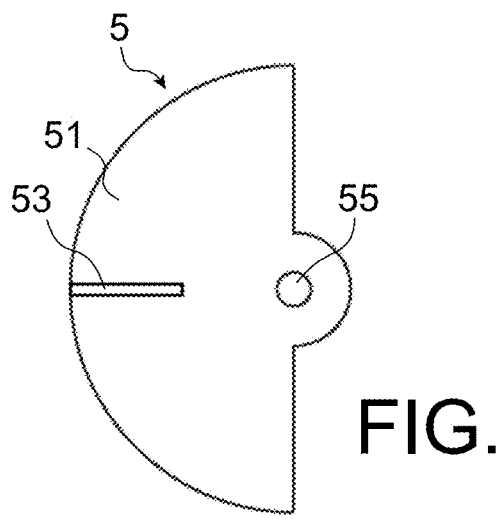
FIGS. 5A-8B illustrate diagrammatically various shapes of mobile members as used in various embodiments of the disclosure herein.
Figure 5B:
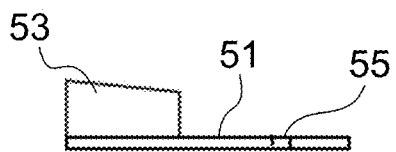

FIG. 5A illustrates a mobile member 5 the plane part 51 of which has the shape of a half-disk including an aileron 53 of quasi-parallelepiped shape at the level of a central radius of the half-disk. Moreover, the mobile member 5 includes a hole 55 at the level of the center of the half-disk allowing it to be rotatably fixed to the optical sensor 3. FIG. 5B is a view in section taken along the central radius of the half-disk showing a section of the aileron 53 of trapezoidal shape.

Figure 6A:
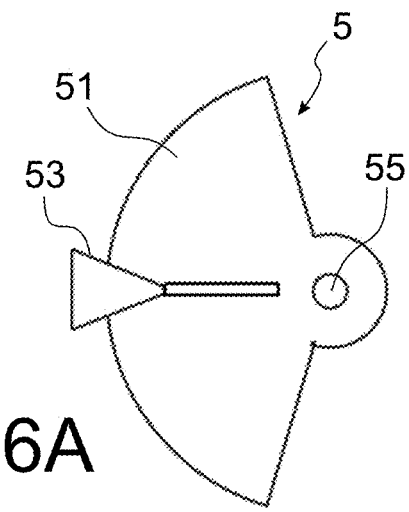
Figure 6B:
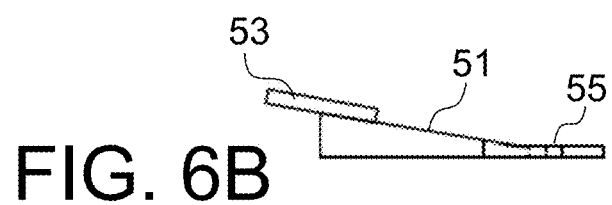

FIG. 6A illustrates a mobile member 5 the plane part 51 of which has the shape of an angular sector delimited by two radii forming between them an angle θ less than 180° but greater than 90°. The mobile member 5 includes an aileron 53 at the level of the central radius of the angular sector. The aileron 53 has a triangular section in a plane parallel to the plane part 51. Likewise, the mobile member 5 includes a hole 55 at the level of the apex of the angular sector allowing it to be rotatably fixed to the optical sensor 3. FIG. 6B is a view in section taken along the central radius showing a cross section of the aileron 53 of rectangular shape and a cross section of the plane part 51 of triangular shape.

Figure 7A:
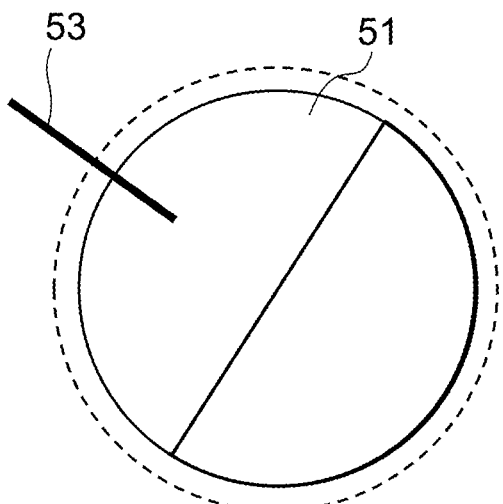
Figure 7B:
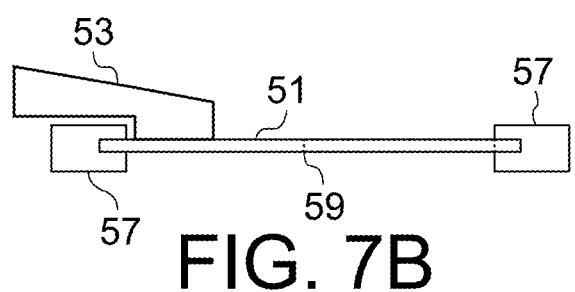

FIG. 7A illustrates a mobile member 5 the plane part 51 of which has the shape of a half-disk rotatably sliding in a channel 57 around the center 59 of the half-disk. The mobile member 5 includes a handle-shaped aileron 53 at the level of the central radius of the half-disk. FIG. 7B is a view in section taken along the central radius of the half-disk showing a quasi-trapezoidal shape section of the aileron 53.

Figure 8A:
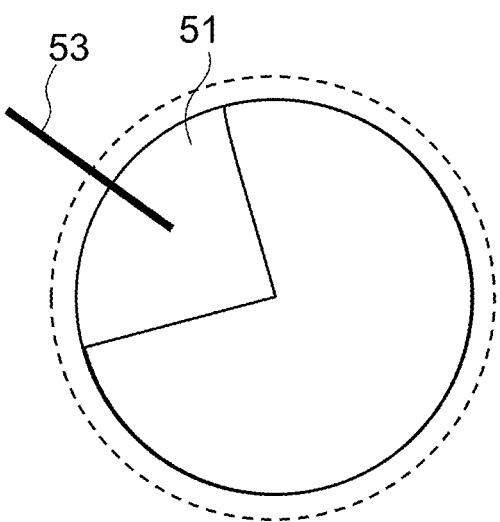
Figure 8B:
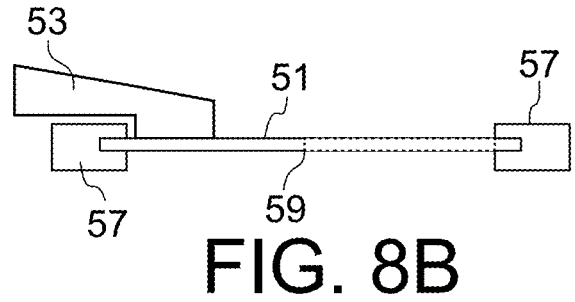

FIG. 8A illustrates a mobile member 5 the plane part 51 of which has the shape of an angular sector delimited by two radii forming between them an angle θ less than 90°. The plane part 51 is configured to slide rotatably about the center 59 of the angular sector in a channel 57. The mobile member 5 includes a handle-shaped aileron 53 at the level of the central radius of the angular sector. FIG. 8B is a view in section taken along the central radius of the angular sector showing a section of the aileron 53 of quasi-trapezoidal shape.

Figure 9:
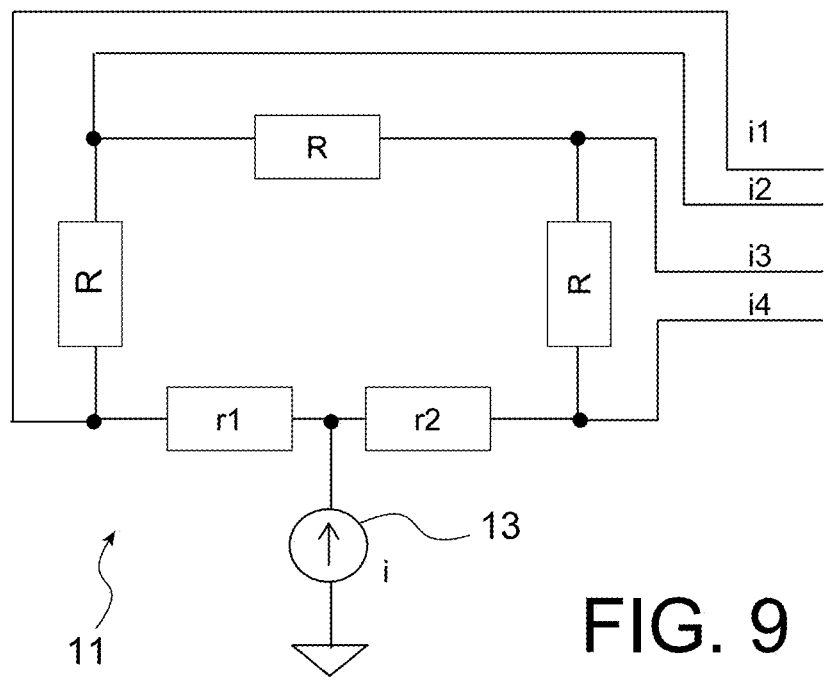
FIG. 9 illustrates diagrammatically an electrical model of a measuring device as used in one embodiment of the disclosure herein.

FIG. 9 illustrates diagrammatically an electrical model of a measuring device in accordance with one embodiment of the disclosure herein.

In fact, a measuring device comprising an optical sensor provided with a mobile member in accordance with the FIG. 3 example may be modeled by an electrical circuit 11. This electrical circuit 11 includes an electrical current generator 13, constant resistances R and variable resistances $r_1$ and $r_2$. In fact, the light incident on the optical sensor 3 behaves as a generator 13 of electrical current the intensity of which varies as a function of the illuminance received. The photodetector 31 of the optical sensor 3 may be represented by a network of constant ohmic conductors R and variable ohmic conductors $r_1$ and $r_2$. The resistive values of the variable ohmic conductors $r_1$ and $r_2$ depend on the distribution of the illuminance over the free surface of the optical sensor 3. It is the mobile member 5 over the free surface of the optical sensor that is responsible for this distribution. Consequently, the currents i1, i2, i3 and i4 sampled at the terminals of the optical sensor 3 via the four extraction connections 33a-33d are themselves a function of the angular position of the mobile member 5.

Figure 10:
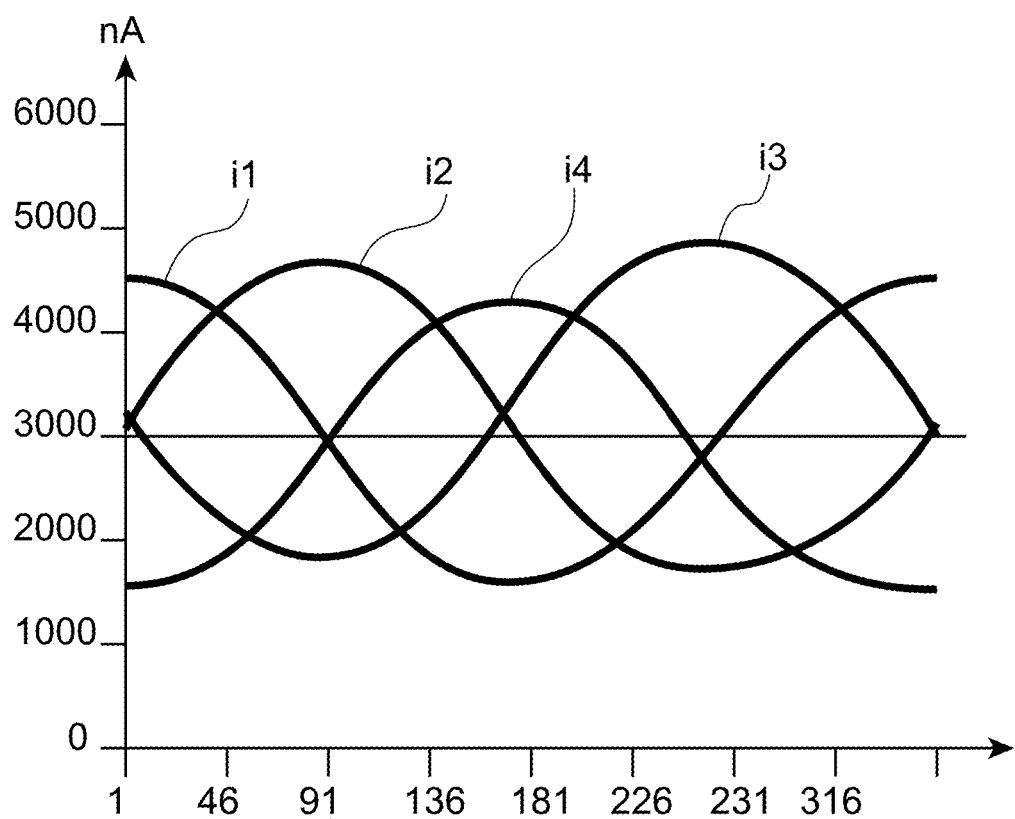
FIG. 10 illustrates diagrammatically a graphical distribution of the intensities of current delivered by the measuring device as a function of the orientation of a half-disk type mobile member as used in one embodiment of the disclosure herein.

FIG. 10 illustrates diagrammatically a graphical distribution of the current intensities delivered by the optical sensor as a function of the orientation of a mobile member of half-disk type.

The FIG. 10 graph relates more particularly to the electrical model from FIG. 9 of an optical sensor 3 provided with a mobile member 5 from FIG. 5A or 7A of half-disk type. This graph gives the values of the current intensities i1, i2, i3 and i4 in nA delivered by the four extraction connections 33a-33d as a function of the orientation expressed in degrees of the mobile member 5. Having recorded this graph beforehand and knowing the current values of the four current intensities i1, i2, i3 and i4, the acquisition and processing unit 7 (FIG. 1B) can therefore easily deduce the current orientation of the mobile member 5.

It should be noted that the optical sensor 3 has an angular measurement accuracy of the order of 1° to 5°. The angular measurement accuracy is advantageously of the order of 1° when a mobile member 5 of half-disk type is used covering half of the optical sensor 3 and having no leakage of light under the mobile member in order to have an optimum contrast between the masked area and that exposed to the light. It should be noted that the use of a mobile member 5 of half-disk type makes it possible to use the optical sensor 3 over all its response range.

Nevertheless, the current intensities i1, i2, i3 and i4 generated by the optical sensor 3 are relatively weak and it is therefore advantageous to use an amplifier in order to amplify them.

Figure 11:
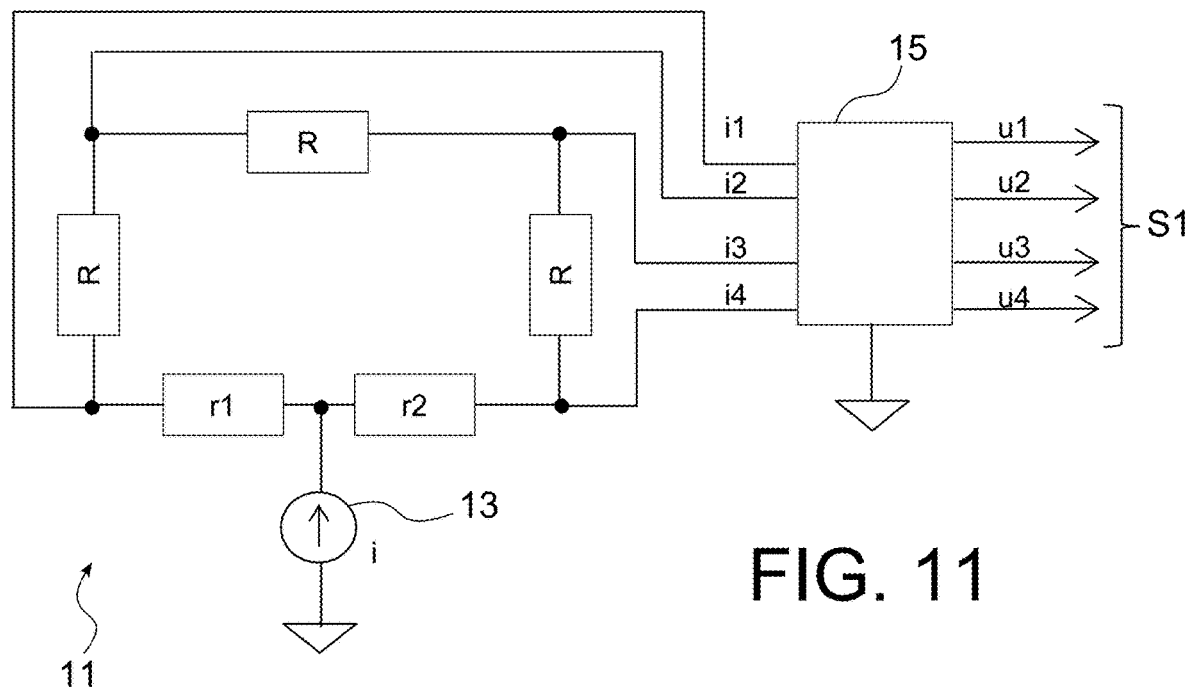
FIG. 11 illustrates diagrammatically the electrical model from FIG. 8 including an amplifier as used in one embodiment of the disclosure herein.

In fact, FIG. 11 illustrates diagrammatically the electrical model from FIG. 9 provided with an amplifier.

The current intensities i1, i2, i3 and i4 generated by the optical sensor 3 are amplified by the amplifier 15 and optionally converted into electrical voltages u1, u2, u3 and u4. These electrical voltages u1, u2, u3 and u4 correspond to an electrical signal S1 that stems from or is the image of the current intensities i1, i2, i3 and i4 output by the optical sensor 3. This electrical signal S1 is transported via a ribbon cable to the acquisition and processing units 7.

Figure 12:
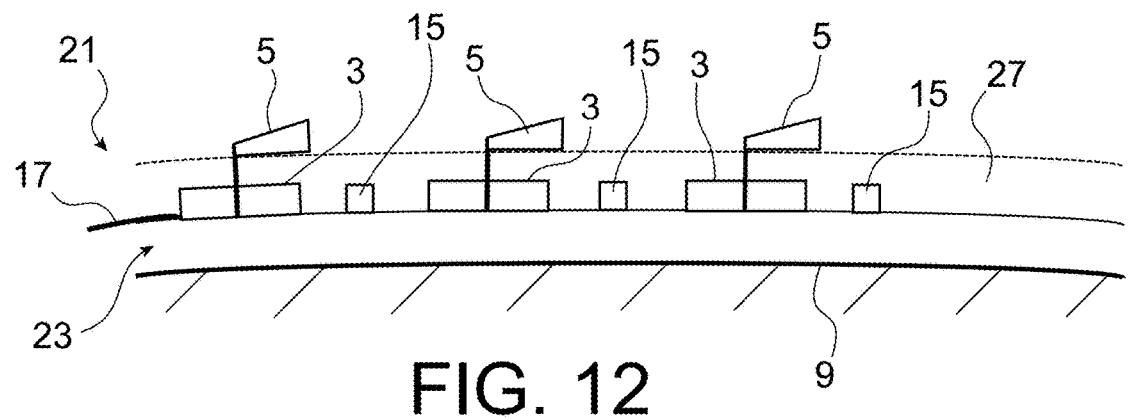
FIG. 12 illustrates diagrammatically a measuring module comprising at least one measuring device as used in one embodiment of the disclosure herein.

FIG. 12 illustrates diagrammatically a measuring module comprising at least one measuring device in accordance with one embodiment of the disclosure herein.

This measuring module 21 corresponds to a patch comprising a substrate 23 on which is disposed at least one measuring device in accordance with the various above embodiments.

The FIG. 12 example more particularly illustrates a measuring module 21 comprising a substrate 23 on which are disposed a plurality of optical sensors 3 provided with mobile members 5, a plurality of amplifiers 15, and electrical connections or a ribbon cable 17. The measuring module 21 advantageously includes a reference frame of reference so that when it is installed on a wall 9 the position of that reference frame of reference is determined relative to the frame of reference of the wall 9.

The optical sensor 3, the mobile member 5 and the substrate are advantageously thin and flexible. For example, the optical sensor comprising the mobile member 5 has a thickness less than 2 mm and the substrate 23 has a thickness less than 0.5 mm and preferably of the order of 0.2 mm. The measuring module can therefore be installed in a relatively non-intrusive manner on a wall of any shape, adapting easily to any curvature of the wall and without disturbing the flow of air along the wall 9.

Moreover, the substrate 23 is adapted to be stuck to the surface of a wall 9, for example by a double-sided adhesive tape, and it is therefore easy to install it on any type of surface, which may be plane or curved. Moreover, the flexible substrate 23 has a resistance to UV, to temperature variations, to pressure variations, etc. in order to be compatible with an application on an aircraft, for example.

The optical sensors 3 manufactured from organic material are stuck to or integrated with the flexible device 23. Moreover, the amplifiers 15, which may be fabricated in silicon, are also stuck to or integrated with the flexible substrate 23. The amplifiers 15 may be installed either between the optical sensors 3 or at the centers of the corresponding optical sensors 3 (i.e. at the level of the central parts of the photodetector rings 31). Each current-voltage amplifier 15 is configured to generate the electrical signal S1 (i.e. u1-u4) by amplifying the current intensities i1-i4 delivered by the corresponding optical sensor 3.

The ribbon cables 17 are adapted to transmit the current intensities from the optical sensors 3 to the corresponding amplifiers 15 and to collect the electrical signals from the amplifiers 15 in order to transmit them to the acquisition and processing units 7. The cables are advantageously stuck to the optical sensors 3 and amplifiers 15 by a glue containing silver to facilitate electrical conduction. The glue containing silver avoids the use of input/output interfaces, which are generally thick. The measuring module 21 therefore retains a small thickness.

The flexible substrate 23, the optical sensors 3, the amplifiers 15 and the ribbon cables 17 are advantageously covered with a protective varnish 27 that is relatively flexible, transparent and potentially polarizable and has a resistance to moisture, to UV, to temperature variations, to pressure variations, etc. in order to be compatible with an application on an aircraft.

The mobile members 5 are rotatably mounted on the corresponding optical sensors 3 and of course on top of the varnish layer 27. The mobile members 5 can therefore slide on the varnish layer 27. It should be noted that the mobile members 5 (and consequently the optical sensors 3) are disposed in such a manner as not to interfere with one another in terms of local aerodynamics. For example, the diameter of each optical sensor 3 may be of the order of 10 mm and the distance between the centers of two adjacent optical sensors 3 may be of the order of 80 mm to 100 mm. The optical sensors 3 may be placed on the flexible substrate 23 in a matrix.

This measuring module 21 makes it possible to reduce the number of connections and electrical circuits and moreover makes it possible to install a plurality of optical sensors 3 accurately and rapidly. Of course, measuring devices (optical sensors 3 provided with the mobile members 5) may also be individually stuck directly onto the surface of the wall 9 to be analyzed.

Figure 13:
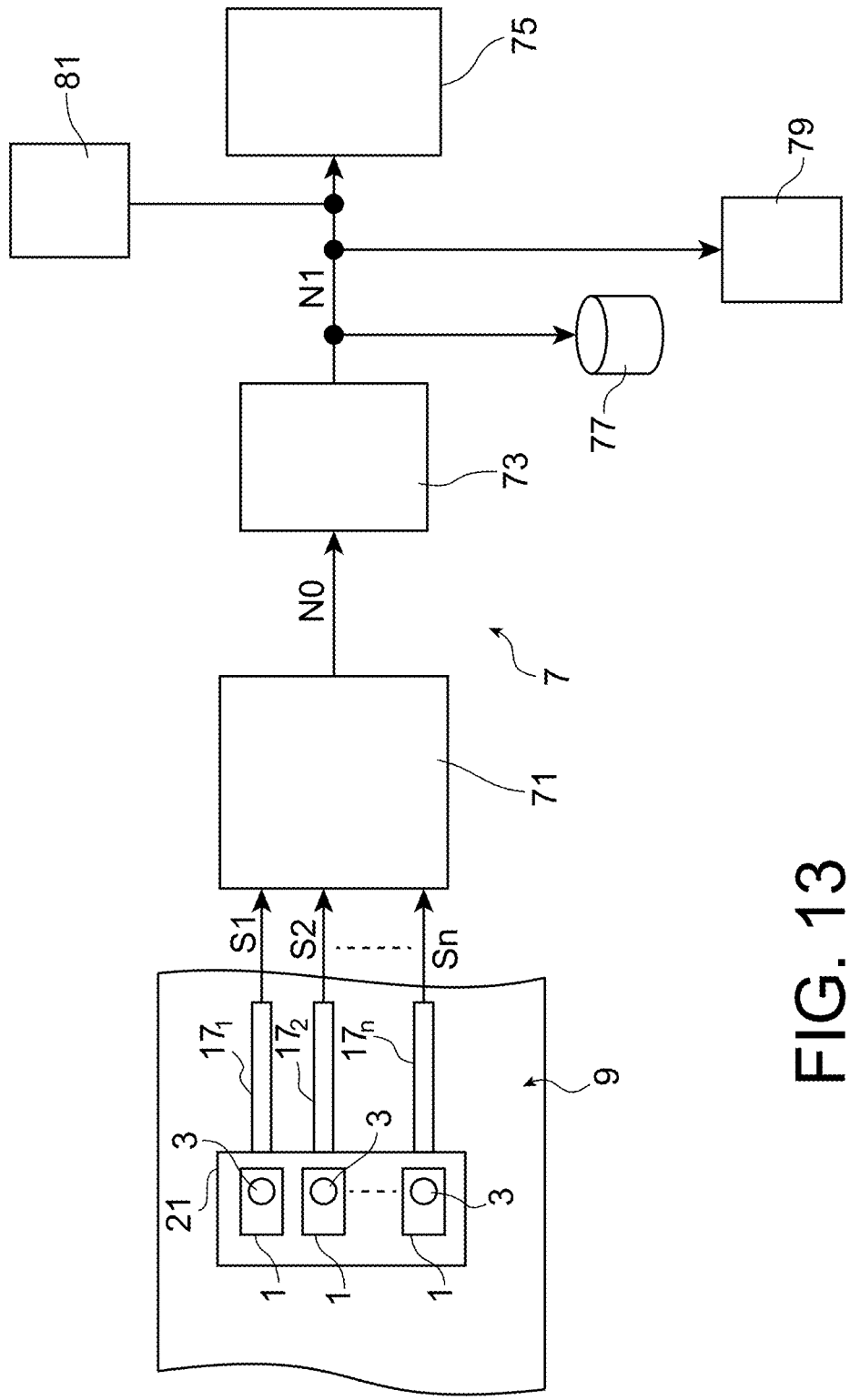
FIG. 13 illustrates diagrammatically a system for aerodynamically measuring flows of air along a wall as used in one embodiment of the disclosure herein.

FIG. 13 illustrates diagrammatically a system in accordance with one embodiment of the disclosure herein for aerodynamic measurement of the flows of air along a wall.

The measuring system includes a measuring module 21 and acquisition and processing units 7 connected to the various optical sensors by ribbon cables. It should be noted that the acquisition and processing units 7 may instead be integrated with the measuring module.

In accordance with this example, the measuring module 21 includes a plurality of measuring devices 1. The measuring module 21 is adapted to be installed in a predetermined position on an area of interest of a wall 9 so that the measurements generated by the optical sensor or sensors 3 of the measuring module 21 represent the aerodynamics of the wall 9.

Accordingly, a set of n ribbon cables $17_1$-$17_n$ coming from a set of n optical sensors 3 is adapted to transport to the acquisition and processing units 7 electrical signals S1-Sn triggered by the optical sensors. The acquisition and processing electronics may advantageously be implemented on a single card or electronic module comprising an acquisition unit 71 and a processing unit 73 to serve the plurality of optical sensors 3.

The acquisition unit 71 is configured to convert the electrical signals S1-Sn into a raw digital signal N0 before transmitting it to the processing unit 73. The acquisition unit 71 more particularly includes a multiplexer and an analog-digital converter. It is configured to acquire the electrical signals S1-Sn representing the distribution of the illuminance over the free surface of each of the optical sensors 3 and to convert these electrical signals S1-Sn into a raw digital signal N0 relating to the current measurements of the orientations of the mobile members. The acquisition frequency used is advantageously of the order of 25 Hz in order to detect potential erratic oscillations of the mobile members 5.

In fact, in order that they may be transmitted without losses, the electrical signals S1-Sn are each digitized on 10 bits, for example (i.e. in a range of 1024 possible values). This quantization on 10 bits generates a small inaccuracy introducing a low level of quantization noise. The 1° accuracy of the optical sensor 3 is therefore simply down to quantization noise.

Moreover, the processing unit 73 includes a microcontroller configured to generate a processed digital signal N1 including the measurements relating to the current orientations of the n mobile members 5 mounted on the n optical sensors 3 and the predetermined positions of the optical sensors 3.

The measuring system advantageously includes a visualization interface 75, a storage device 77, and a sending device 79.

The processed digital signal N1 may thereafter be transmitted to the visualization interface 75 (for example a screen) and/or to the storage device 77 and the sending device 79. It is therefore possible to visualize in real time on a screen 75 the positions of the optical sensors 3 on the wall 9 and the current orientations of the corresponding mobile members 5. The processed digital signal N1 may also be stored in the storage device 77 (for example a memory or database).

The processed digital signal N1 including the data relating to the orientations of one or more mobile members 5 may advantageously be transmitted in real time by the sending device 79 to an analysis center to be analyzed in real time.

Moreover, the measuring system 1 may itself include an analysis device 81 (for example a computer or a processor) configured to determine the aerodynamic parameters of the wall 9 as a function of the predetermined positions of the sensors 3 and the current orientations of the mobile members 5 defined by the processed digital signal N1. These parameters comprise the state of the parietal flow and the directions of the parietal stream lines.

The state of the parietal flow may be classified as one of three states, namely stable, unstable and separated states. The criterion for differentiating the behavior of the flow is based on the size of the angular range in which the mobile member 5 is located at a given moment. The flow may be considered as unstable as soon as that angular range departs significantly from a zero range and as separated as soon as that angular range is greater than +/−35°.

Moreover, the direction of the parietal stream lines makes it possible to characterize the flow locally and globally with very high accuracy.

Figure 14A:
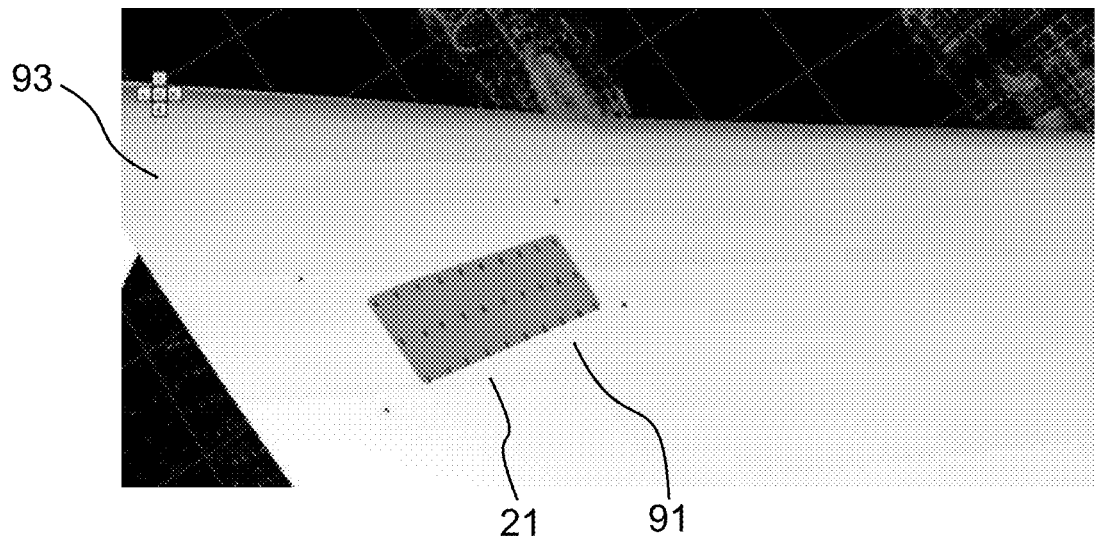
FIGS. 14A and 14B illustrate diagrammatically a measuring module installed on an aircraft as used in one embodiment of the disclosure herein.

FIG. 14A illustrates diagrammatically a measuring module in accordance with one embodiment of the disclosure herein installed on an aircraft.

At least one measuring module 21 is installed on at least one area of interest 91 of the aircraft 93 intended to be analyzed during a test flight. The measuring modules 21 may be stuck to the top and/or bottom surfaces of the aircraft 93 such as the wings and the fuselage (for example by a double-sided adhesive tape). When a measuring module 21 is installed, the position of the reference frame of reference of the module 21 is determined as a function of the frame of reference of the aircraft, for example by geolocation, by tracking laser, or simply by measurement using a measuring tape.

It should be noted that a measuring module 21 may include one or more measuring devices 1. It should also be noted that the measuring devices 1 may also be stuck individually to different parts of the aircraft.

The electrical signals from the various optical sensors 3 are transmitted to an onboard acquisition and processing device. This device delivers a processed digital signal N1 including the predetermined positions of the optical sensors 3 on the area of interest 91 as well as the current (i.e. instantaneous) orientations of the mobile members 5. The processed digital signal N1 may be stored in onboard storage and may also be visualized in real time on a screen.

Moreover, the processed digital signal N1 may be analyzed in real time by an onboard analysis device. In fact, based on the processed digital signal N1, the analysis device constructs indicators based on the position and the orientation of each mobile member 5 as a function of time. These indicators include, for example, the angle of the mobile member 5 as a function of the reference frame of reference and the level of variations of the orientation of the mobile member 5 as a function of time. These indicators make it possible to analyze the state of the flow and moreover make it possible to analyze the stream lines on the surface of the aircraft knowing that the direction indicated by each mobile member 5 is tangential to the stream line of the flow. These two types of analysis may be combined to obtain a representation of the flow over a digital model of the aircraft.

Figure 14B:
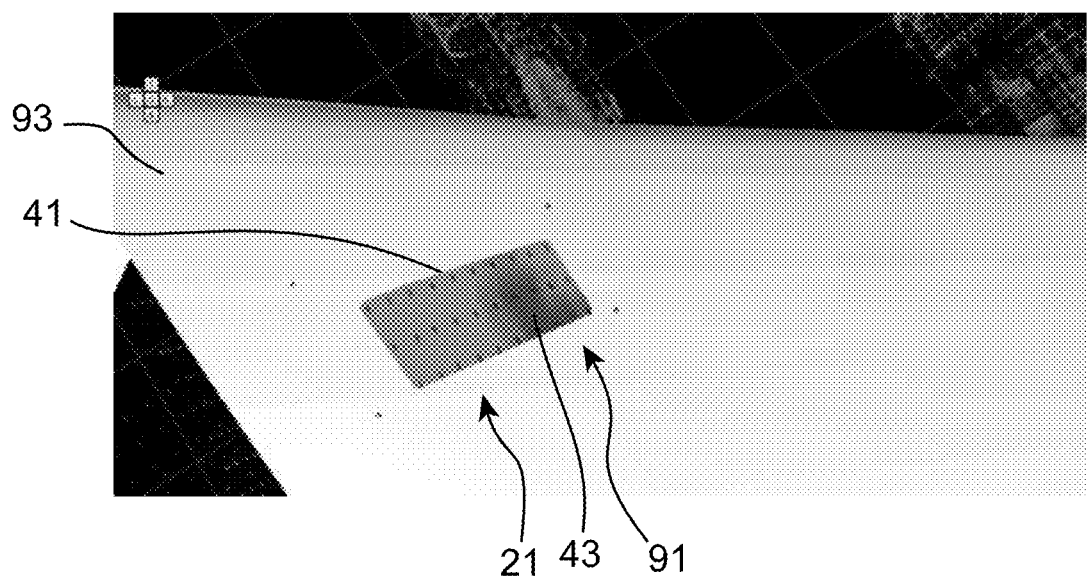

In fact, FIG. 14B illustrates an analysis combining the state of the flow and the stream lines. The lines 41 represent the directions of the stream lines at the location of the mobile members and in color (here represented by a grey mark 43) the state of the flow that is a function of the defined indicator. Here the grey level reflects the level of agitation of each mobile member.

Alternatively, given that the processed digital signal N1 includes a limited number of data items (i.e. constant positions of the optical sensors and current orientations of the mobile members), this signal may easily be transmitted to the ground in real time by an onboard sending device in order to be analyzed in real time by specialists on the ground. Of course, the analysis may also be carried out offline after the aircraft has landed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for measuring a flow of air along a wall, the device comprising:
    an optical sensor configured to detect an illuminance by ambient light and to measure an illuminance distribution over a free surface of the optical sensor; and
    a mobile member movably mounted on the optical sensor and partially covering the free surface, the mobile member being adapted to be freely oriented with a local flow of air, thereby modulating the illuminance distribution over the free surface of the optical sensor so that a current measurement by the optical sensor of the illuminance distribution indicates a current orientation of the mobile member representing current flow of air;
    wherein the mobile member includes a plane part covering a part of the free surface of the optical sensor, the plane part having a shape of an angular sector delimited by two radii forming between them an angle greater than 5°; and
    wherein the mobile member includes a fin disposed perpendicularly on the plane part.

2. The device according to claim 1, wherein the optical sensor comprises an annular photodetector comprising a predetermined number of light-detecting tracks and delivering signals representing the illuminance received by each of the tracks, thereby generating a measurement of the illuminance distribution over the free surface of the optical sensor.

3. The device according to claim 1, wherein the optical sensor comprises printed organic electronic components and wherein the optical sensor has an angular measurement accuracy of 1° to 5°.

4. The device according to claim 1, wherein the angle is 180°.

5. A measuring module comprising at least one measuring device according to claim 1.

6. The measuring module according to claim 5, comprising a substrate on which the at least one measuring device is disposed.

7. A system for aerodynamically measuring in real time flows of air along a wall, including at least one measuring module according to claim 5, wherein each measuring module is adapted to be installed in a predetermined position on an area of interest of the wall so that measurements generated by each optical sensor of the measuring module correspond to aerodynamics of the wall.

8. The system according to claim 7, comprising acquisition and processing units configured to acquire the current measurement from each optical sensor and to convert the current measurement into a current digital measurement defining the current orientation of the mobile member mounted on a corresponding optical sensor.

9. The system according to claim 7, comprising an emission device configured to emit data in real time, the data relating to orientations of at least one mobile member mounted on at least one optical sensor of the measuring module.

10. The system according to claim 7, comprising a visualization interface configured to visualize orientations of at least one mobile member of the measuring module in real time.

11. The system according to claim 7, comprising an analysis device configured to determine aerodynamic parameters of the wall, the aerodynamic parameters comprising a status of parietal flow and a direction of parietal stream lines as a function of a position of the measuring module and an orientation of at least one mobile member of the measuring module.

12. An aircraft including a measuring system according to claim 7.

13. A device for measuring a flow of air, the device comprising:
    an optical sensor configured to measure an illuminance distribution over a free surface of the optical sensor;
    a layer of protective varnish covering the optical sensor; and
    a mobile member movably mounted on the optical sensor and the layer of protective varnish, such that the mobile member is slidable on the layer of protective varnish, in a position that the mobile member partially covers the free surface of the optical sensor, the mobile member being adapted to be freely oriented with a local flow of air, thereby modulating the illuminance distribution over the free surface of the optical sensor so that a current measurement by the optical sensor of the illuminance distribution indicates a current orientation of the mobile member representing current flow of air.

\* \* \* \* \*